Patented May 11, 1954

2,678,294

UNITED STATES PATENT OFFICE 2,678,294

FUMIGANT COMPOSITION COMPRISING (2-BROMOETHYL) BENZENE

Charles R. Youngson, Long Beach, Calif., assignor to The Dow Chemical Company, Midland, Mich., a corporation of Delaware No Drawing. Application February 21, 1952, Serial No. 272,900

4 Claims. (Cl. 167—39)

The present invention is concerned with the fumigation of growth media and is particularly directed to a method and composition for the control of soil inhabiting invertebrates which attack the underground parts of plants.

It is an object of the present invention to provide an improved method for the fumigation and disinfection of growth media infested with nematodes and other invertebrates which attack plant roots. A further object is to provide a novel growth media composition. Another object is to supply an improved fumigant composition. Other objects will become apparent from the following specification and claims.

According to the present invention, it has been discovered that soil inhabiting nematodes, which attack the underground parts of plants, may be controlled by distributing in soil or related growth media a parasiticidal amount of (2-bromoethyl) benzene. The latter compound is a relatively colorless non-inflammable liquid boiling at about 217° C. at atmospheric pressure. It has a relatively low order of toxicity to man and higher animals and its application to soil is not accompanied by the hazards characterizing many soil fumigant materials. Another advantage is that (2-bromoethyl) benzene may be conveniently and readily distributed in soil or other growth media. Further, the (2-bromoethyl) benzene, when distributed through growth media, accomplishes a rapid control of soil inhabiting invertebrate organisms. Also, when dispersed in soil, the compound is sufficiently persistent to accomplish the desired effect upon the soil organisms, but dissipates in a reasonable period of time so as not to poison the soil over an extended period.

The expression "growth media" is employed in the present specification and claims in its broadest sense to be inclusive of all conventional "soils," as defined in Webster's New International Dictionary, Second Edition, Unabridged, published in 1937 by G. and C. Merriam and Company, Springfield, Massachusetts. Thus, the term refers to any substance or medium in which vegetative organisms may take root and grow, and is intended to include not only soil, but also humus, manure, compost, sand and the like, adapted to support plant growth.

When operating in accordance with the present invention (2-bromoethyl) benzene may be dissolved in a suitable solvent such as toluene, chlorinated hydrocarbons or petroleum oils to prepare fumigant compositions. Depending upon the proportion of ingredients, the compositions may be employed as concentrates and substantially diluted with additional solvent to obtain the desired amount of active ingredient in a composition adapted to facilitate the distribution of the fumigant in growth media. Such liquid carrier concentrates commonly contain from 10 to 95 percent or more by weight of toxic ingredient.

Further, the (2-bromoethyl) benzene may be incorporated in intimate mixture with a dispersing and emulsifying agent, such as sodium lauryl sulfate, complex organic ester derivatives, aromatic aliphatic ether alcohols and the like to form fumigant concentrate compositions. Such concentrates are readily dispersible in water or other liquid carriers to form fumigant compositions containing the toxic ingredient in any desired amount. The toxicant preferably constitutes from about 10 to 95 percent by weight of the concentrate. The choice of dispersing agent and amount thereof employed are determined by the ability of the agent to facilitate the dispersion of the concentrate in the liquid carrier to produce the desired fumigant composition.

Similarly, the (2-bromoethyl) benzene may be mechanically mixed with a suitable water-immiscible organic liquid and an emulsifying agent to produce emulsifiable liquid concentrates, which may be further diluted with water and oil to prepare fumigant mixtures in the form of oil in water emulsions, i. e. aqueous emulsion compositions. Aqueous emulsion refers to the mixture of water, water-immiscible organic liquid and emulsifying agent. Preferred emulsifying agents to be employed in these compositions are oil soluble and include the non-ionic emulsifiers such as the condensation products of alkylene oxide with phenols and organic acids, polyoxyethylene derivatives of sorbitan esters, complex ether alcohols and the like. However, oil soluble ionic emulsifying agents may also be used. Suitable organic liquids to be employed in the compositions include petroleum oils and distillates, toluene, liquid halo hydrocarbons and synthetic organic oils. The toxicant in the emulsifiable concentrate compositions preferably constitutes from 10 to 95 percent or more by weight of the composition.

The (2-bromoethyl) benzene may also be dispersed in and on a finely divided inert solid material to form solid carrier compositions. According to such practice, a finely divided solid carrier such as chalk, talc, pyrophyllite, attapulgite, fuller's earth or bentonite is mixed or wet with the fumigant material. In general, such compositions contain from 6 to 20 percent by weight of the fumigant material.

The exact concentration of (2-bromoethyl) benzene to be employed in compositions for the treatment of growth media is not critical, provided that a minimum effective dosage is supplied in the media. In applications to growth media, good results are obtained when a dosage of toxicant is supplied in the amount of from 15 to 125 parts or more per million parts by weight of the medium. In applications to soil, good results are obtained when the (2-bromoethyl) benzene fumigant is distributed at the rate of from 25 to 200 pounds or more per acre, and through such a cross-section of the soil as to provide for the presence therein of a parasiticidal concentration of the (2-bromoethyl) benzene. In such applications, it is desirable that the compound be distributed to a depth of at least two inches. When the treatment is carried out by conventional injection or drilling techniques, it is preferred that the maximum distance between deposits is not in excess of 12 inches. The indicated amounts of toxicant conveniently may be supplied per acre in from 6 to 12,000 gallons or more of water or other liquid carrier, or in from 100 to 800 pounds or more of solid carrier.

The concentration of fumigant in liquid compositions employed to supply the desired dosage is from 0.1 to 50 percent or higher in water or other liquid carrier. In dusts, the concentration of the fumigant may be from 3 to 20 percent by weight.

A preferred embodiment of the present invention is a novel, completely treated, soil composition comprising soil or related growth media in admixture with a parasiticidal amount of (2-bromoethyl) benzene. Such soil compositions are found to be relatively free of soil-inhabiting invertebrate organisms. In general, the compositions may contain from 15 to 125 parts or more by weight of (2-bromoethyl) benzene per million parts of growth media.

When operating in accordance with the present invention, a parasiticidal amount of (2-bromoethyl) benzene is distributed in any suitable fashion in soil or other growth media. If desired, the unmodified material may be employed, but generally a liquid or solid carrier composition containing the (2-bromoethyl) benzene, is mechanically mixed with the growth medium.

To accomplish the distribution of the toxicant under field conditions, either the use of a liquid carrier to accomplish the penetration of the soil, or the dragging, discing or mixing of the treated surface is desired. Thus, (2-bromoethyl) benzene, or a composition containing it, may be applied to the surface of the soil and thereafter dragged or disced into the soil to the desired depth. On the other hand, the fumigant, or a composition containing it, may be placed in the furrow behind a conventional plowshare and thereafter covered by the succeeding furrow slice. In a preferred method for accomplishing the distribution of the toxicant in soil, a liquid composition containing the (2-bromoethyl) benzene is distributed by spot injection or conventional drilling techniques. In injection operations, a piston pump applicator or similar device is employed to deliver a measured quantity of the treating material into the soil at spaced intervals and at a predetermined depth. In drilling operations, a convenient apparatus consists of a power-drawn or self-propelled applicator including a plurality of steel blades or shanks, 6 to 12 inches apart and to which are attached delivery tubes connecting with a reservoir containing the treating material. The latter flows through the tubes under pressure at a point behind each blade and at the predetermined depth below the surface of the soil. The apparatus is moved through the field to accomplish the distribution of the liquid fumigant material. In either the injection or drilling operations, it is preferred that the soil disturbed by the introduction of the fumigant be replaced and packed. Following injection, it is sufficient for the operation to press the soil back in place. In drilling operations, a packing wheel, drag or other device may be rigged behind the delivery tubes to press down the soil and over the freshly deposited liquid fumigant.

In another preferred method, the distribution may be accomplished by introducing a water dispersible or emulsifiable composition containing the fumigant material into the water employed to irrigate the soil. In this method of distribution, the amount of water applied may be varied in accordance with the porosity and water held capacity of the soil in order to obtain the desired depth of distribution of the fumigant material.

The application of (2-bromoethyl) benzene to soil may be carried out at the completion of the plowing, discing or other operation calculated to condition the soil for planting. When the application is made with the water employed to irrigate the soil, the soil conditioning procedures are generally carried out prior to planting. In any event, it is preferred that the planting operation not be carried out until one week following the distribution of the fumigant material. When following such practices, no adverse effect upon germination or plant growth has been observed due to the presence of any (2-bromoethyl) benzene residue.

The preferred soil temperature at the time of treatment is 50° F. or higher since the effectiveness of the (2-bromoethyl) benzene against soil dwelling invertebrates may be reduced at lower temperatures.

The following examples illustrate the invention but are not to be construed as limiting.

*Example 1*

(2-bromoethyl) benzene was dissolved in a petroleum hydrocarbon fraction boiling at from 190°–272° F., to produce a fumigant composition containing 85 grams of toxicant per liter of the ultimate mixture. This composition was employed for the treatment of a seed bed which was heavily infested with root knot nematode. At the time of treatment, the seed bed soil had a moisture content of about 10 percent. In the treating operations, the fumigant mixture was injected into the soil in an amount sufficient to supply 50 and 100 pounds of toxicant per acre and at a depth of about 4 inches below the soil surface. Following the application, the average soil temperature remained at about 62° F. Each treatment was replicated 5 times.

One week after the applications, the treated plots and untreated check plots were planted with tomato seeds. During the following growing period there was observed no adverse effect upon the germination and growth of seedlings attributable to the presence of residual fumigant. About 5 weeks after planting, the plants were lifted from the soil, the roots washed, the latter examined for evidence of nematode attack and the plants weighed. The examination indicated that an 89 and a 100 percent control of nematodes had been obtained in the soil at dosages of 50 and 100 pounds per acre, respectively, with heavy infestation in the check plots. When the plants were weighed it was found that the plants from the treated plots had an average weight which was 47 percent greater than the average weight of the plants in the check plots.

Example 2

The fumigant composition described in Example 1, was employed for the treatment of a nematode infested seed bed having a moisture content of about 5 percent. In these operations, the toxicant mixture was injected in the soil in an amount sufficient to supply 50, 100, and 150 pounds of toxicant per acre. Following the application, the average soil temperature remained at about 62° F. Each treatment was replicated 5 times.

Eight days later, samples of soil from the treated plots and from untreated check plots were examined microscopically and counts of nematodes made in order to determine the percentage control of the organism. The examination indicated that a 66, 90, and 93 percent control of nematodes had been obtained in the soil treated at dosages of 50, 100, and 150 pounds per acre, respectively.

Example 3

In a similar manner, the composition as set forth in Example 1 was employed for the treatment of a sandy loam soil heavily infested with egg and adult forms of root knot nematode. The treating operation was carried out by injecting the fumigant mixture into the soil at dosages of 50, 100, and 150 pounds per acre, with 5 replications for each treatment.

Eight days after treatment, samples of soil from the treated plots and untreated check plots, were examined microscopically and counts of nematode larvae made in order to determine the percent control of nematode eggs. The examination indicated that a 63, 80, and 90 percent control of nematode eggs had been obtained in the treated soil at dosages of 50, 100, and 150 pounds per acre, respectively.

Example 4

The fumigant composition of Example 1 was employed as previously described for the treatment of a clay loam soil heavily infested with sugar beet nematode cysts. At the time of treatment, the soil had a moisture content of about 17 percent. The application was carried out by injecting the composition in the soil in an amount sufficient to supply 150 pounds of toxicant per acre, the treatment being replicated 5 times.

One week later, samples of soil from the treated plots and from untreated check plots were examined microscopically and counts of nematode larvae made in order to determine the percentage control of nematode cysts. The examination indicated that a 70 percent control of the cyst form of the sugar beet nematode had been obtained.

Example 5

The same fumigant composition was also employed for the treatment of a sandy loam soil heavily infested with both egg and adult forms of citrus root nematodes. The applications were carried out as previously described to distribute 50, 100, and 150 pounds of toxicant per acre, with 5 replications for each treatment.

One week following the applications, samples of soil from the treated plots and from untreated check plots were examined microscopically and counts of nematode larvae made in order to determine the percentage control of nematode eggs. The examination indicated that a 73, 78, and 94 percent control of citrus nematode eggs had been obtained in the treated soil at dosages of 50, 100, and 150 pounds per acre.

Example 6

Ninety parts by weight of (2-bromoethyl) benzene and 10 parts of an alkylated aryl polyether alcohol (Triton X-45) are mechanically mixed together to prepare a concentrate fumigant composition in the form of a water dispersible liquid. In a similar manner, 50 parts by weight of (2-bromoethyl) benzene, 40 parts of xylene and 10 parts of an alkyl aryl polyethylene glycol ether (Igepol CA) are mixed together to prepare a concentrate composition in the form of an emulsifiable liquid. These compositions are adapted to be dispersed in water to prepare aqueous fumigant compositions which have very desirable wedding and penetrating properties.

Example 7

Ninety parts by weight of (2-bromoethyl) benzene and 10 parts of an alkylated aryl polyether alcohol (Triton X-100) are mixed together to prepare a concentrate fumigant composition in the form of a water dispersible liquid. This concentrate composition was thereafter dispersed in water to obtain compositions of varying concentration of toxicant. The compositions are employed for the irrigation of seed beds heavily infested with root knot nematodes. In such operations, the fumigant mixtures are employed at a dosage of 0.5 acre inch of composition per acre of soil surface, to distribute 100 and 200 pounds of toxicant per acre to a depth of about 5 inches.

After one week, the treated plots and untreated check plots are planted to lima beans. About three months after planting, the plots are examined and representative plants lifted from the soil, their roots washed and the latter examined for evidence of attack by nematodes. In the treated plots, 99 percent of the plants are found to be free of gall formation. In the untreated plots, the roots of only 4 percent of the plants are found free of nematode injury.

I claim:

1. A soil fumigant composition comprising (2-bromethyl) benzene as an active toxic ingredient in intimate association with an aqueous emulsion.

2. A method of controlling nematodes in soil which comprises applying to and mixing with soil a parasiticidal amount of (2-bromoethyl) benzene.

3. A method for protecting the underground parts of plants against attack by nematodes which comprises applying to and mixing with soil (2-bromoethyl) benzene in the amount of at least 15 parts per million parts by weight of soil.

4. A method for controlling soil dwelling nematodes which comprises applying to and mixing with field soil (2-bromoethyl) benezene to a depth of at least 2 inches beneath the soil surface and at a substantially uniform dosage of at least 25 pounds per acre.

References Cited in the file of this patent

UNITED STATES PATENTS

| Number | Name | Date |
|---|---|---|
| 2,377,446 | Payne | June 5, 1945 |
| 2,380,416 | Davidson | July 31, 1945 |
| 2,448,265 | Kagy | Aug. 31, 1948 |
| 2,555,796 | Krause | June 5, 1951 |

OTHER REFERENCES

Heilbron, Dictionary of Organic Compounds, page 295 (1943).